(12) United States Patent
Coccia et al.

(10) Patent No.: US 8,169,797 B2
(45) Date of Patent: May 1, 2012

(54) AC/DC INTERMEDIATE-CIRCUIT CONVERTER HAVING A VERY WIDE AC INPUT VOLTAGE RANGE

(75) Inventors: Antonio Coccia, Baden (CH); Francisco Canales, Baden (CH)

(73) Assignee: ABB AG, Mannheim (DE)

( * ) Notice: Subject to any disclaimer, the term of this patent is extended or adjusted under 35 U.S.C. 154(b) by 510 days.

(21) Appl. No.: 12/486,384

(22) Filed: Jun. 17, 2009

(65) Prior Publication Data

US 2009/0316443 A1 Dec. 24, 2009

(30) Foreign Application Priority Data

Jun. 18, 2008 (DE) .......................... 10 2008 028 952

(51) Int. Cl.
*H02M 3/335* (2006.01)
*H02M 5/40* (2006.01)
*H02M 3/18* (2006.01)
*H02M 7/00* (2006.01)
*H02M 1/10* (2006.01)
*H02J 3/00* (2006.01)

(52) U.S. Cl. ........... 363/21.03; 363/17; 363/34; 363/61; 363/142

(58) Field of Classification Search ............. 363/17, 363/21.02, 21.03, 34, 35, 37, 61, 142
See application file for complete search history.

(56) References Cited

U.S. PATENT DOCUMENTS

| | | | | |
|---|---|---|---|---|
| 5,654,884 A * | 8/1997 | Mohan | ........................... | 363/126 |
| 5,831,846 A * | 11/1998 | Jiang | ............................. | 363/125 |
| 5,956,243 A * | 9/1999 | Mao | ................................. | 363/61 |
| 6,137,700 A * | 10/2000 | Iida et al. | ........................ | 363/89 |
| 6,147,882 A * | 11/2000 | Huber et al. | .................... | 363/39 |
| 6,344,979 B1 * | 2/2002 | Huang et al. | .................... | 363/16 |
| 6,349,044 B1 * | 2/2002 | Canales-Abarca et al. | ..... | 363/17 |
| 7,375,991 B2 * | 5/2008 | Shin | ................................. | 363/59 |
| 2003/0007366 A1 * | 1/2003 | Drummond et al. | ............ | 363/17 |
| 2006/0067096 A1 * | 3/2006 | Odell | ............................. | 363/143 |
| 2007/0296383 A1 * | 12/2007 | Xu et al. | ....................... | 323/282 |

* cited by examiner

*Primary Examiner* — Jessica Han
*Assistant Examiner* — Gary Nash
(74) *Attorney, Agent, or Firm* — Buchanan Ingersoll & Rooney PC

(57) ABSTRACT

An AC/DC intermediate-circuit converter has a very wide AC input voltage range with a ZVS three-level DC/DC resonant converter with an LLC series-resonant circuit. Two intermediate-circuit capacitors are connected in series between DC intermediate-circuit connections with their common connection point forming a DC intermediate-circuit center connection (5). The DC intermediate-circuit connections are connected to the DC connections of a rectifier whose AC input connections have an AC input voltage applied thereto. A range changeover switch is arranged between an AC input connection and the DC intermediate-circuit center connection. The range changeover switch is closed in a lower AC input voltage range, when the ZVS three-level DC/DC resonant converter is operated on the basis of a "two-level operating mode" modulation strategy, such that the LLC series-resonant circuit has the full DC input voltage present between the DC intermediate-circuit connections applied to it. The range changeover switch is open in a central AC input voltage range when the ZVS three-level DC/DC resonant converter is operated on the basis of the "two-level operating mode" modulation strategy. The range changeover switch is open in an upper AC input voltage range when the ZVS three-level DC/DC resonant converter is operated on the basis of a "three-level operating mode" modulation strategy, such that the LLC series-resonant circuit has only half the DC input voltage that is present between the DC intermediate-circuit connections applied to it.

14 Claims, 6 Drawing Sheets

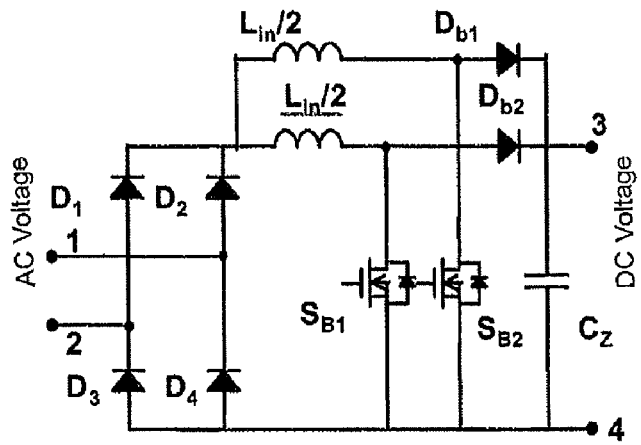
Fig. 9
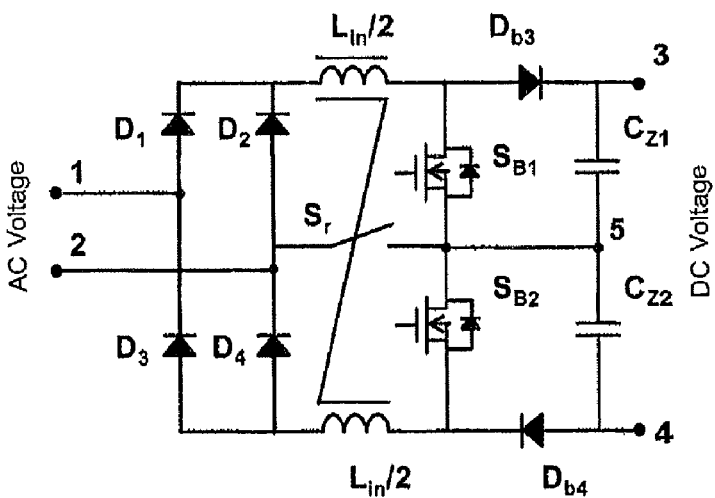
Fig. 10
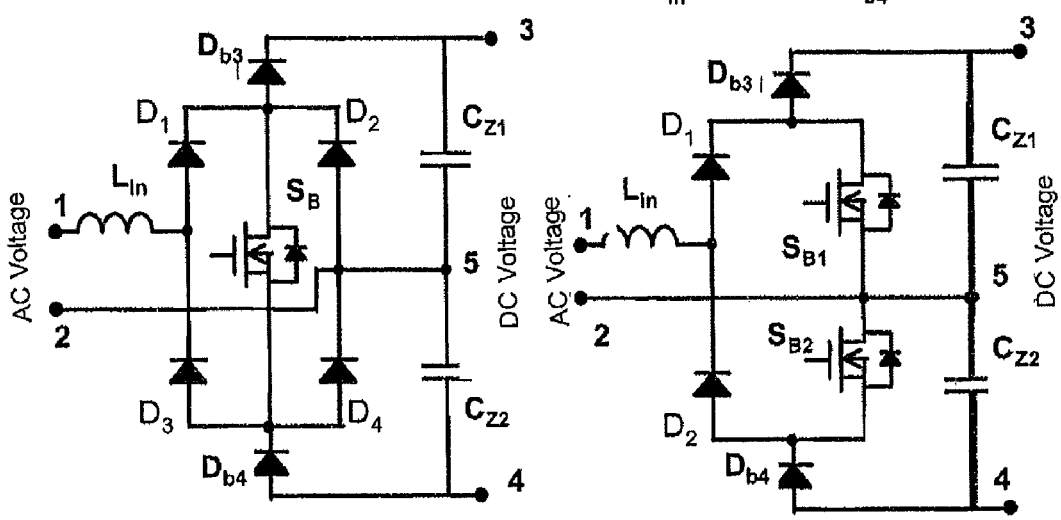
Fig. 11
Fig. 12

AC/DC INTERMEDIATE-CIRCUIT CONVERTER HAVING A VERY WIDE AC INPUT VOLTAGE RANGE

RELATED APPLICATION

This application claims priority under 35 U.S.C. § 119 to German Patent Application No. 10 2008 028 952.3 filed in Germany on Jun. 18, 2008, the entire content of which is hereby incorporated by reference in its entirety.

FIELD

The present disclosure relates to an AC/DC intermediate-circuit converter with a very wide AC input voltage range.

BACKGROUND INFORMATION

U.S. Pat. No. 6,344,979 B1 discloses an LLC series-resonant circuit DC/DC converter for which full-bridge inverters are proposed, and as an alternative to this, two series-connected half-bridges, on the input side, for acting on the primary side of a transformer. The voltage which is produced on the secondary side of the transformer is supplied, after rectification, to a load. In general, in this case, an LLC series-resonant circuit has a resonant capacitor with a series-connected resonant inductance, which by way of example is formed by the stray inductance of a transformer, as well as an inductance which is connected in parallel with the primary winding of the transformer, with the latter inductance being formed, for example, by a magnetization inductance.

SUMMARY

An AC/DC intermediate-circuit converter is disclosed as having a very wide AC input voltage range with a ZVS three-level DC/DC resonant converter, which has four primary switches that are arranged in series between first and second DC intermediate-circuit connections and that include a first and a second outer primary switch, and a first and a second inner primary switch. The exemplary AC/DC intermediate-circuit converter comprises: an LLC series-resonant circuit having a resonant inductance connected to a common connection point between the two inner primary switches; two intermediate-circuit capacitors being connected in series between the first and second DC intermediate-circuit connections with a common connection point between the two intermediate-circuit capacitors forming a DC intermediate-circuit centre connection; and a range changeover switch arranged between an AC input connection and the DC intermediate-circuit centre connection.

According to an exemplary embodiment, the range changeover switch is configured to be closed in a lower AC input voltage range, when the ZVS three-level DC/DC is operated in accordance with a two-level operating mode in which, according to a first level of the two-level operating mode, the first outer primary switch and the first inner primary switch are driven jointly, and, according to a second level of the two-level operating mode, the second inner primary switch and the second outer primary switch are driven jointly, such that the LLC series-resonant circuit has the full DC input voltage, which is present between the first and second DC intermediate-circuit connections, applied thereto. The range changeover switch is configured to be open in a central AC input voltage range when the ZVS three-level DC/DC resonant converter is operated according to the two-level operating mode. The range changeover switch is configured to be open in an upper AC input voltage range when the ZVS three-level DC/DC resonant converter is operated according to a three-level operating mode, in which, according to one level of the three-level operating mode, the first outer primary switch and the second inner primary switch are operated in a complementary manner, and, according to another level of the three-level operating mode, the first inner primary switch and the second outer primary switch are operated in a complementary manner, such that the LLC series-resonant circuit has only half the DC input voltage, which is present between the first and second DC intermediate-circuit connections, applied thereto.

An exemplary AC/DC intermediate-circuit converter is disclosed as having a very wide AC input voltage range with a ZVS three-level DC/DC resonant converter, which has four primary switches that are arranged in series between first and second DC intermediate-circuit connections and that include a first and a second outer primary switch, and a first and a second inner primary switch. The exemplary AC/DC intermediate-circuit converter can include a transformer having a primary winding; an LLC series-resonant circuit having a resonant inductance connected to a common connection point between the two inner primary switches; a magnetization inductance connected in parallel with the primary winding of the transformer and a resonant capacitor to a common connection point between the second outer primary switch and the second DC intermediate-circuit connection; an input capacitor connected between a common connection point between the first outer primary switch and the first inner primary switch and a common connection point between the second inner primary switch and the second outer primary switch; two intermediate-circuit capacitors being connected in series between the first and second DC intermediate-circuit connections with a common connection point between the two intermediate-circuit capacitors forming a DC intermediate-circuit centre connection; a rectifier having, on a DC side thereof, DC connections connectable to the first and second DC intermediate-circuit connections, and, on an AC side thereof, AC connections being configured to have an AC input voltage applied thereto; and a range changeover switch arranged between an AC input connection and the DC intermediate-circuit centre connection.

According to an exemplary embodiment, the range changeover switch is configured to be closed in a lower AC input voltage range, when the ZVS three-level DC/DC is operated in accordance with a two-level operating mode in which, according to a first level of the two-level operating mode, the first outer primary switch and the first inner primary switch are driven jointly, and, according to a second level of the two-level operating mode, the second inner primary switch and the second outer primary switch are driven jointly, such that the LLC series-resonant circuit has the full DC input voltage, which is present between the first and second DC intermediate-circuit connections, applied thereto. The range changeover switch is configured to be open in a central AC input voltage range when the ZVS three-level DC/DC resonant converter is operated according to the two-level operating mode. The range changeover switch is configured to be open in an upper AC input voltage range when the ZVS three-level DC/DC resonant converter is operated according to a three-level operating mode, in which, according to one level of the three-level operating mode, the first outer primary switch and the second inner primary switch are operated in a complementary manner, and, according to another level of the three-level operating mode, the first inner primary switch and the second outer primary switch are operated in a complementary manner, such that the LLC series-resonant circuit has only half the DC input voltage, which is present between the first and second DC intermediate-circuit connections, applied thereto.

BRIEF DESCRIPTION OF DRAWINGS

The disclosure will be explained in the following text with reference to the exemplary embodiments which are illustrated in the drawing, in which:

FIGS. 8-12 show various examples of input-side booster rectifiers with the capability for active power-factor control.

DETAILED DESCRIPTION

Figure 1:
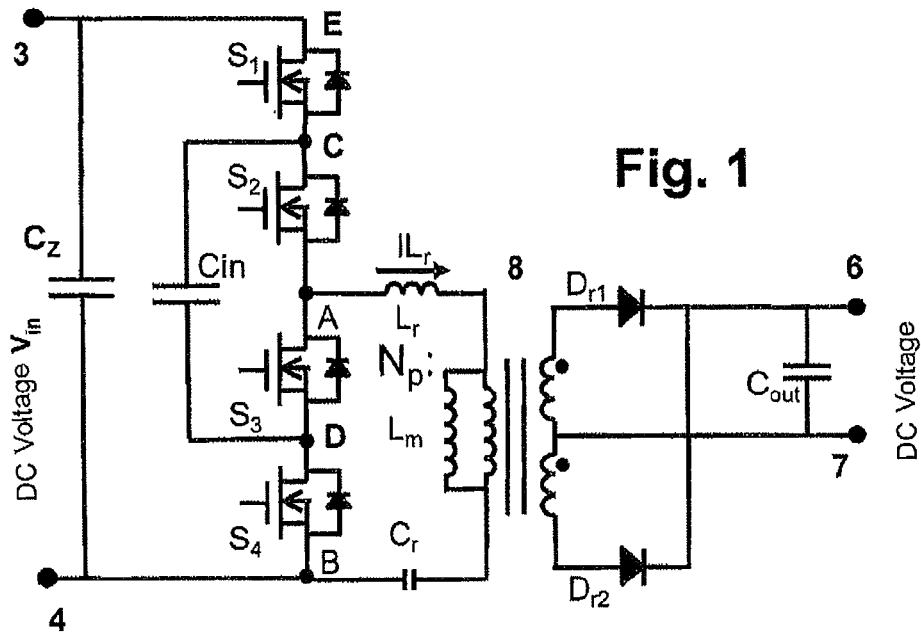
FIG. 1 shows, in a general form, the circuit design of a ZVS three-level DC/DC resonant converter.

An exemplary embodiment provides an AC/DC intermediate-circuit converter which can be operated on an optimized-energy basis, is based on an LLC series-resonant circuit DC/DC converter such as this, and has a very wide AC input voltage range.

According to an exemplary embodiment, an AC/DC intermediate-circuit converter is provided which has a very wide AC input voltage range with a ZVS three-level DC/DC resonant converter, which has four primary switches. The four primary switches can be arranged in series between two DC intermediate-circuit connections and can include a first and a second outer primary switch as well as a first and a second inner primary switch. The exemplary AC/DC intermediate-circuit converter can include the following constituent features:

a) a common connection point between the two inner primary switches can be connected via an LLC series-resonant circuit having a resonant inductance, a magnetization inductance can be connected in parallel with the primary winding of a transformer, and a resonant capacitor can be provided to the common connection point between the second outer primary switch and the second DC intermediate-circuit connection;

b) a common connection point between the first outer and the first inner primary switches can be connected via an input capacitor to the common connection point between the second inner and the second outer primary switches;

c) two intermediate-circuit capacitors can be connected in series between the two DC intermediate-circuit connections with their common connection point forming a DC intermediate-circuit centre connection;

d) the DC intermediate-circuit connections can be connected to the DC connections of a rectifier whose AC input connections have the AC input voltage applied to them;

e) a range changeover switch can be arranged between an AC input connection and the DC intermediate-circuit centre connection;

f) the range changeover switch can be closed in a lower AC input voltage range, and the ZVS three-level DC/DC resonant converter can be operated on the basis of a "two-level operating mode" modulation strategy, in which, in each case, on the one hand, the first outer primary switch and the first inner primary switch are driven jointly, and, on the other hand, the second inner primary switch and the second outer primary switch are driven jointly, such that the LLC series-resonant circuit in each case has the full DC input voltage that is present between the DC intermediate-circuit connections applied to it;

g) the range changeover switch can be open in a central AC input voltage range and the ZVS three-level DC/DC resonant converter can likewise be operated on the basis of the "two-level operating mode" modulation strategy; and h) the range changeover switch can be open in an upper AC input voltage range and the ZVS three-level DC/DC resonant converter being operated on the basis of a "three-level operating mode" modulation strategy, in which the first outer primary switch and the second inner primary switch, on the one hand, as well as the first inner primary switch and the second outer primary switch, on the other hand, are operated in a complementary manner, such that the LLC series-resonant circuit has only half the DC input voltage that is present between the DC intermediate-circuit connections applied to it.

Advantages which can be achieved by the exemplary embodiments of the present disclosure are, for example, that the performance and efficiency of the overall system are not constrained despite the very wide AC input voltage range. The transformer does not need to be designed for a wide input voltage range but rather for a range which is very much narrower than the wide AC input voltage range, thus considerably simplifying the optimum design of the transformer, and in this case, the design of the core that may be required. The stray inductance of the transformer and its magnetization inductance can be embodied by component elements of the LLC resonant circuit. The combination of the input-side three-level structure with the two different modulation strategies and the LLC resonant circuit can ensure a high power density and efficiency of the AC/DC intermediate-circuit converter despite the very wide AC input voltage range.

According to an exemplary embodiment, two cascade-connected converters can be used for AC/DC intermediate-circuit converters with a very wide AC input voltage range, to allow optimization of the passive components and to reduce the voltage load and current load in the semiconductors. In this case, the first stage (rectifiers) can improve the power factor and the distortion factor (harmonic load) of the converter. Furthermore, this first stage can match the AC input voltage which is specifically present and can be connected to AC input connections. In the end, this leads to a configuration with an essentially constant intermediate-circuit voltage, thus offering better optimization capability with regard to the second stage (DC/DC converter). In the first stage, a voltage-doubling configuration, which can be implemented by a range changeover switch, can be utilized to avoid negative effects of a very wide AC input voltage range on the power density and the design options for the AC/DC intermediate-circuit converter. In the event of very major discrepancies in the AC input voltage, the performance of the first stage will, however, be highly adversely affected, as before.

FIG. 1 shows the circuit design of an exemplary ZVS three-level DC/DC resonant converter. The meanings of the symbols are as follows:

3, 4 DC intermediate-circuit connections
6, 7 DC output connections
8 Transformer
A Circuit point in the DC/DC converter, which corresponds to a centre connection of the primary switch series circuit, e.g., connection point of the primary switches $S_2$, $S_3$
B Circuit point in the DC/DC converter, which corresponds to a connection point of the primary switch $S_4$ to the DC intermediate-circuit connection 4
C Connection point of the primary switches $S_1$, $S_2$
D Connection point of the primary switches $S_3$, $S_4$
E Connection point of the primary switch $S_1$ to the DC intermediate-circuit connection 3
$C_{in}$ Input capacitor of the DC/DC converter
$C_{out}$ Output capacitor of the DC/DC converter
$C_r$ Resonant capacitor in the DC/DC converter
$C_Z$ Intermediate-circuit capacitor
$D_{r1}$, $D_{r2}$ Secondary diodes in the DC/DC converter
$I_{Lr}$ Current through the resonant inductance
$L_m$ Magnetization inductance of the transformer of the DC/DC converter
$L_r$ Resonant inductance of the DC/DC converter
$S_1$, $S_2$, $S_3$, $S_4$ Primary switches on the DC/DC converter including back-to-back parallel-connected diodes (feedback diodes), of which, in detail:
$S_1$ First outer primary switch
$S_2$ First inner primary switch
$S_3$ Second inner primary switch
$S_4$ Second outer primary switch An exemplary operating mode of the ZVS three-level DC/DC resonant converter with a very wide AC input voltage range will be explained in greater detail below. As used herein, ZVS is generally the abbreviation for "zero-voltage switch", thus expressing an exemplary configuration in which the power semiconductors can switch at a voltage of zero volts.

As illustrated in the example of FIG. 1, on the primary side, the exemplary DC/DC converter can be constituted by a three-level structure based on capacitors $C_{in}$, $C_Z$. This makes it possible to reduce the voltage load on the primary switches $S_1$, $S_2$, $S_3$, $S_4$, which are connected in series between the DC intermediate-circuit connections 3, 4 (with the DC voltage $V_{in}$ applied). According to an exemplary embodiment, the LLC series-resonant circuit is provided on the primary side, and can be formed from the resonant inductance $L_r$ located at the circuit point A (corresponding to the connection point of $S_2$ and $S_3$), the magnetization inductance $L_m$ of the transformer 8 and the resonant capacitor $C_r$ located at the circuit point B (corresponding to the DC intermediate-circuit connection 4) allows zero-voltage switching of the primary switches $S_1$, $S_2$, $S_3$, $S_4$. In contrast to a conventional series-resonant converter, the exemplary ZVS three-level DC/DC resonant converter can advantageously operate at frequencies above or below the resonant frequency, which is governed by the resonant inductance $L_r$ and the resonant capacitor $C_r$, and can nevertheless ensure zero-voltage switching of the primary switches $S_1$, $S_2$, $S_3$, $S_4$. The use of the magnetization inductance $L_m$ of the transformer 8 can facilitate achieving the zero-voltage switching of the primary switches $S_1$, $S_2$, $S_3$, $S_4$.

The magnetization inductance $L_m$, which is connected in parallel with the primary winding of the transformer 8, can also provide soft-switching of the exemplary ZVS three-level DC/DC resonant converter in a wide load range without any need to increase either the Q factor of the LLC series-resonant circuit or the ratio between the switching frequency and the resonant frequency. Consequently, this can also decrease the energy circulating within the ZVS three-level DC/DC resonant converter. Furthermore, the resonant capacitor $C_r$ can block DC components produced as a result of the exemplary modulation method. This can ensure an equilibrium state of the magnetic flux in the transformer 8. According to an exemplary embodiment, the secondary side of the ZVS three-level DC/DC resonant converter can be equipped with diode rectifiers in a full-wave configuration, half-wave configuration or voltage-doubling configuration, for example. In the exemplary embodiment, the secondary winding of the transformer 8 can be subdivided, with the winding elements being connected to the anodes of secondary diodes $D_{r1}$, $D_{r2}$, whose cathodes are connected to one another and form the DC output connection 6. The further DC output connection 7 can be located at the common connection of the two winding elements. An output capacitor $C_{out}$ can be connected between the two DC output connections 6, 7.

The exemplary ZVS three-level DC/DC resonant converter can be controlled using variable switching frequencies. The ZVS three-level DC/DC resonant converter can be configured to increase the input voltage when it is operated below the resonant frequency. The switching frequency can be reduced to control the output voltage when the input voltage decreases.

According to an exemplary embodiment, the ZVS three-level DC/DC resonant converter can be configured so that the secondary diodes $D_{r1}$, $D_{r2}$ are operated subject to the condition of zero-current switching. This can advantageously decrease the problem relating to the reverse recovery times.

Depending on the operating conditions, the exemplary ZVS three-level DC/DC resonant converter can have two different operating modes according to an exemplary embodiment. Each operating mode can have three stages during each half of the switching cycle.

The second operating mode can occur when the exemplary ZVS three-level DC/DC resonant converter is operated at a switching frequency which is lower than the resonant frequency, which is governed by the resonant inductance $L_r$ and the resonant capacitor $C_r$. This exemplary operating mode will be explained in more detail below with reference to FIG. 2 and FIGS. 3a-3c, since this mode of operation has a number of advantages, such as decreasing the switching-off losses of the primary switches $S_1$, $S_2$, $S_3$, $S_4$ and reducing the problem relating to the reverse recovery times in the secondary diodes $D_{r1}$, $D_{r2}$.

Both operating modes (non-resonant operating mode on the one hand and resonant operating mode on the other hand) ensure soft-switching and can be implemented easily in the ZVS three-level DC/DC resonant converter.

Figure 3A:
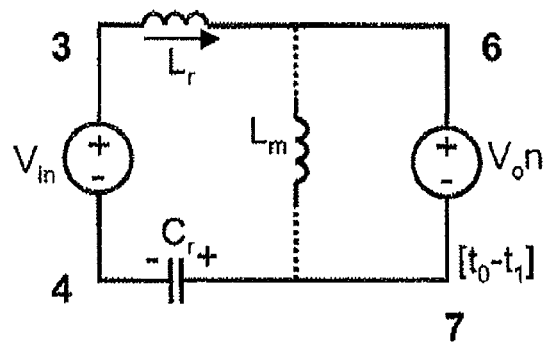
FIGS. 3a-3c show examples of equivalent circuits to explain the exemplary "two-level operating mode" modulation strategy shown in FIG. 2.
Figure 3B:
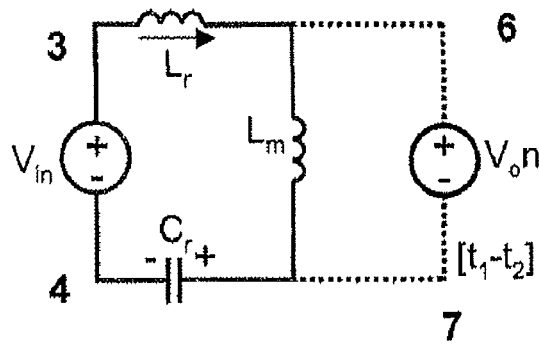
Figure 3C:
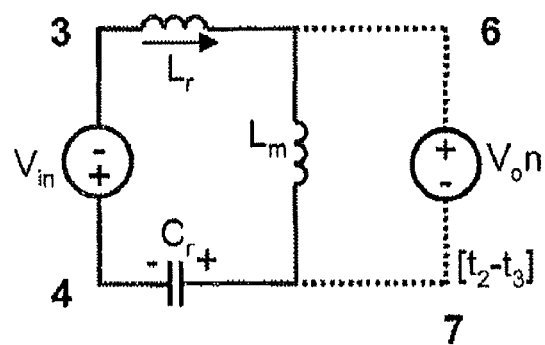

The exemplary second operation mode of the ZVS three-level DC/DC resonant converter will be explained in more detail in the following text with reference to FIG. 2 and FIGS. 3a, 3b, 3c. These figures show exemplary waveform, of variables of interest, such as:

$V_{gs}$ Drive signals for the primary switches in the DC/DC converter
$V_{ab}$ Voltage between the circuit points A and B
$V_{in}$ Input voltage to the DC/DC converter
$V_o$n Transformed output voltage of the DC/DC converter
$I_{Lr}$ Current through the resonant inductance
$I_{Lm}$ Current through the magnetization inductance
$I_{S1}$, $I_{S3}$ Current through the primary switch n Transformation ratio of the transformer in the DC/DC converter $t_0, t_1, t_2, t_3$ Times for the definition of time intervals FIGS. 3a, 3b, 3c show exemplary configurations of the circuits, which are equivalent for the second operating mode, for the three stages which occur during each half of the switching cycle.

FIG. 3a shows the first stage of the second operating mode, that is to say the time interval between the times $t_0$ and $t_1$. At the start of this time interval, the first outer primary switch $S_1$ and the first inner primary switch $S_2$ are switched on, and the current through the resonant inductance $L_r$ flows through the back-to-back parallel-connected diodes of these primary switches $S_1$ and $S_2$. At the time $t_0$, the primary current changes direction, and the difference between half of the input voltage $V_{in}$ and the transformed output voltage $V_o n$ is applied to the LLC series-resonant circuit, where n is the transformation ratio of the transformer 8. An oscillation therefore starts between the resonant capacitor $C_r$ and the resonant inductance $L_r$. The input power is transmitted to the output during this first stage.

FIG. 3b shows the second stage of the second operating mode, that is to say the time interval between the times $t_1$ and $t_2$. At the time $t_1$, the resonant current through the resonant inductance $L_r$ reaches the magnetization current, as a result of which the secondary side of the transformer 8 is decoupled from the primary side. At this time $t_1$, a new oscillation starts between the resonant inductance $L_r$, the magnetization inductance $L_m$ of the transformer 8 and the resonant capacitor $C_r$.

FIG. 3c shows the third stage of the second operating mode, that is to say the time interval between the times $t_2$ and $t_3$. At the time $t_2$, the primary switches $S_1$ and $S_2$ are switched off by means of the magnetization inductance $L_m$, thus reducing the switching-off losses. Furthermore, the magnetization inductance $L_m$ discharges the parasitic capacitances of the primary switches $S_3$ and $S_4$ to zero, in order to switch on their back-to-back parallel-connected diodes, resulting in a negative voltage across the transformer 8. Since the back-to-back parallel-connected diodes of the primary switches $S_3$ and $S_4$ are carrying the primary current, the primary switches $S_3$ and $S_4$ can be operated as zero-voltage switches. During this third stage, the secondary side remains decoupled from the primary side of the DC/DC converter. Furthermore, the oscillation between the resonant inductance $L_r$, the magnetization inductance $L_m$ of the transformer 8 and the resonant capacitor $C_r$ continues. At the end of this third stage, the primary current changes its direction, thus starting the next half of the switching cycle, in which the second inner primary switch $S_3$ and the second outer primary switch $S_4$ are switched on. In summary, the exemplary ZVS three-level DC/DC resonant converter can be operated in a lower AC input voltage range on the basis of a "two-level operating mode" modulation strategy, in which the first outer primary switch $S_1$ and the first inner primary switch $S_2$ are each initially jointly driven, and the second inner primary switch $S_3$ and the second outer primary switch $S_4$ are then jointly driven, such that the LLC series-resonant circuit in each case has the full DC input voltage, which is present between the DC intermediate-circuit connections 3, 4, applied to it.

The exemplary resonant operating mode of the LLC series-resonant circuit as explained above therefore ensures the ZVS operating mode with reduced switching-off losses for the primary switches $S_1$, $S_2$, $S_3$, $S_4$ and reduced losses in the secondary diodes $D_{r1}$, $D_{r2}$.

As mentioned above, optimization of the overall system can be highly problematic because of the desired very wide AC input voltage range of the DC/DC intermediate-circuit converter. In the case of a two-stage configuration with an (input-side) rectifier and an (output-side) DC/DC converter, the DC voltage of the intermediate circuit is normally regulated, thus allowing optimization of the second stage, that is to say of the separate DC/DC converter. However, the first stage (rectifier) is problematic, as described before, because of the desired very wide variation range of the AC input voltage. In order to satisfy desired requirements relating to the distortion factor (harmonic load), the first stage can normally be carried out using a booster rectifier (step-up controller), with the DC voltage of the intermediate circuit being chosen such that it is higher than the maximum peak value of the (network-side) AC input voltage. The gain factor of the rectifier must therefore be increased for the lowest AC input voltage, which raises the root-mean-square current in the power semiconductors. In addition, the voltage which is applied to the input-side inductance $L_{in}$ loads the existing requirements for current ripple.

The solution to these drawbacks may be an intermediate-circuit DC voltage which is predetermined variably, corresponding to the instantaneous AC input voltage. In this solution, the DC voltage in the intermediate circuit can be preset in the lower AC input voltage range, corresponding to the maximum peak value of the AC input voltage in this lower range. In the central AC input voltage range, the DC voltage of the intermediate circuit can be preset to comply with the operating conditions which have now been predetermined and allow optimization of the first stage.

In order to comply with these predetermined requirements, the second stage requires a DC/DC converter with the capability to operate at different DC input voltages. One problem associated with soft-switching DC/DC converters is their poor operating response when they have to operate over a wide DC input voltage range. In an application such as this, the variation of the DC input voltage not only results in a reduction in the transformer turns ratio but also in major discrepancies in the switching frequency or in the load cycle. For these reasons, optimization of the DC/DC converter is difficult to achieve, to be precise not only as a consequence of the increasing load on the power semiconductors and the increase in the energy circulating within the DC/DC converter, but also because of reduced efficiency.

According to an exemplary embodiment, the implementation of a DC/DC converter based on an input-side three-level structure allows the use of different modulation strategies (modulation schemes) which are based on a "two-level operating mode", a "three-level operating mode", or a "mixed two-three-level operating mode". Since this characteristic is used as a function of and depends on the specific instantaneous DC input voltage, it is possible to minimize the fluctuations, caused by a wide DC input voltage range, in the performance of the DC/DC converter. In this way, the DC/DC converter can be operated in the lower AC input voltage range using the "two-level operating mode" modulation strategy as illustrated in FIGS. 2, 3a-3c. In this case, the full DC input voltage can be applied to the transformer 8 and the LLC series-resonant circuit. In the upper DC input voltage range, which means a higher DC voltage in the intermediate circuit in a two-stage configuration (rectifier+DC/DC converter), the modulation mode can be varied such that the transformer 8 and the LLC series-resonant circuit have only half the (now higher) DC input voltage applied to them. This exemplary technique is referred to in the following text as the "three-level operating mode" modulation strategy.

Figure 4:
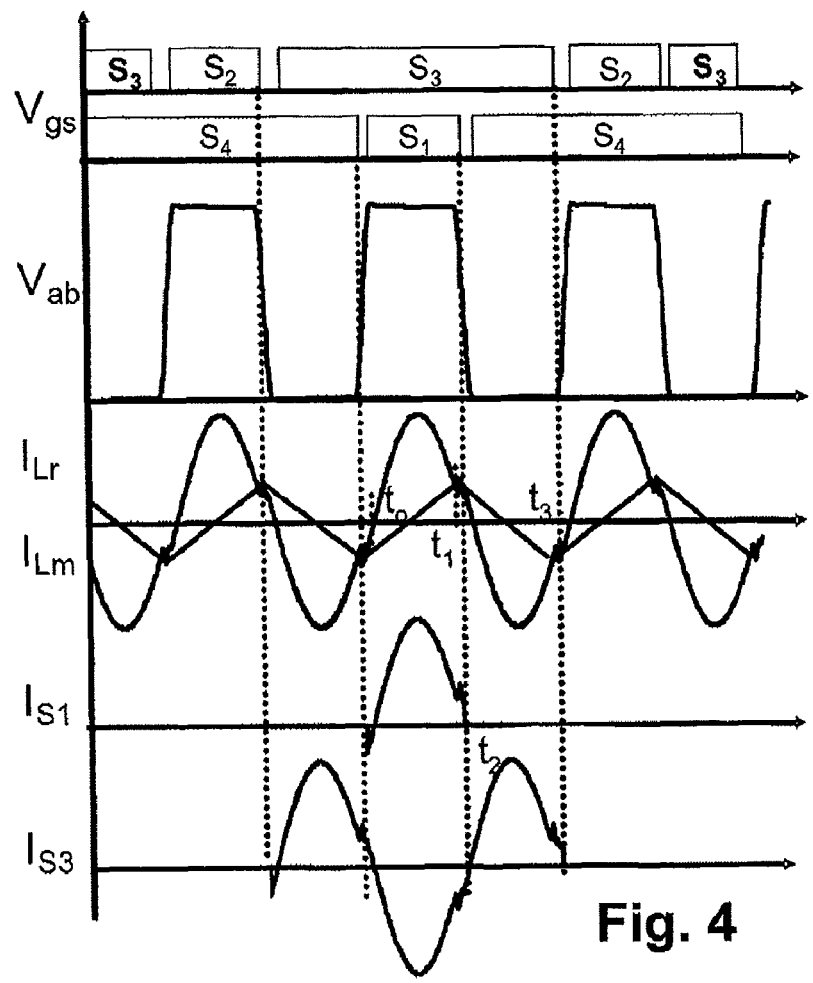
FIG. 4 shows examples of waveforms of major variables for a "three-level operating mode" modulation strategy of the exemplary ZVS three-level DC/DC resonant converter.

FIG. 4 shows examples of the waveforms of the major variables for this modulation strategy, which includes a "three-level operating mode" in the upper DC input voltage range. As can be seen, the first outer primary switch $S_1$ and the second inner primary switch $S_3$, on the one hand, and the first inner primary switch $S_2$ and the second outer primary switch $S_4$, on the other hand, are operated in a complementary manner. Although the load cycle of these primary switches can be adjusted in order in this way to regulate the output voltage, the load cycle for the primary switch $S_1$ and correspondingly for the primary switch $S_2$ is fixed at 25% of that load cycle at which the maximum voltage gain is achieved with this modulation strategy. The exemplary ZVS three-level DC/DC resonant converter can be operated using a "three-level operating mode" modulation strategy such that the LLC series-resonant circuit has only half the DC input voltage, which is present between the DC intermediate-circuit connections 3, 4, applied to it.

FIG. 4 furthermore shows that the exemplary "three-level operating mode" modulation strategy results in a frequency at the LLC series-resonant circuit and at the transformer 8 which corresponds to twice the value of the switching frequency. In order to achieve the same gain characteristic in the LLC series-resonant circuit, the switching frequency of the primary switches $S_1$, $S_2$, $S_3$, $S_4$ can be fixed at half the switching frequency value which occurs in the lower input voltage range.

Figure 2:
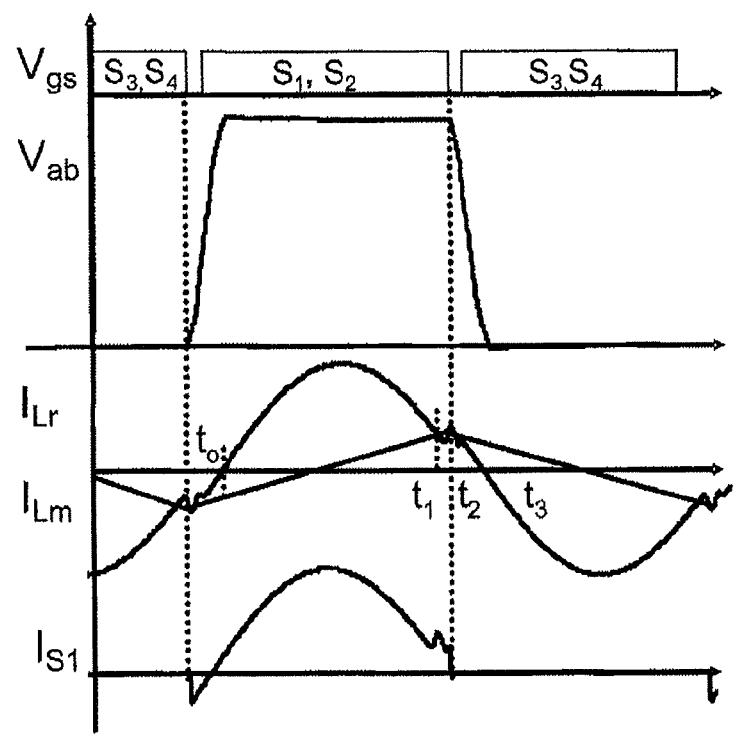
FIG. 2 shows examples of waveforms of major variables for a second operating mode of the ZVS three-level DC/DC resonant converter, which is also referred to as a "two-level operating mode" modulation strategy.

It should also be mentioned that in the case of these two operating modes or the "two-level operating mode" modulation strategies as shown in FIGS. 2, 3a-3b (used for a "low" DC input voltage) on the one hand and the "three-level operating mode" shown in FIG. 4 (used for a "high" DC input voltage) on the other hand, this results in the same curve profiles, which results in similar root-mean-square values and peak values in the currents for the power semiconductors, the LLC series-resonant circuit and the transformer 8. The switching losses are also the same in both operating modes, as well.

This ensures a good optimization capability in all cases in both operating modes.

The first stage of the two-stage configuration and of the AC/DC intermediate-circuit converter, the rectifier, will now be considered in more detail. The normal input stage contains a full-bridge rectifier followed by a large smoothing capacitor. This smoothing capacitor can reduce the ripple on the voltage waveform in the second stage, the DC/DC converter. However, one problem of this input current is that it causes extraordinary peak input currents and non-linear distortion in the network. The distortion factor (harmonic load) with this type of rectification is normally in the range from 55% to 65%. The power factor which results from this can have a similarly poor value.

Figures 5, 6:
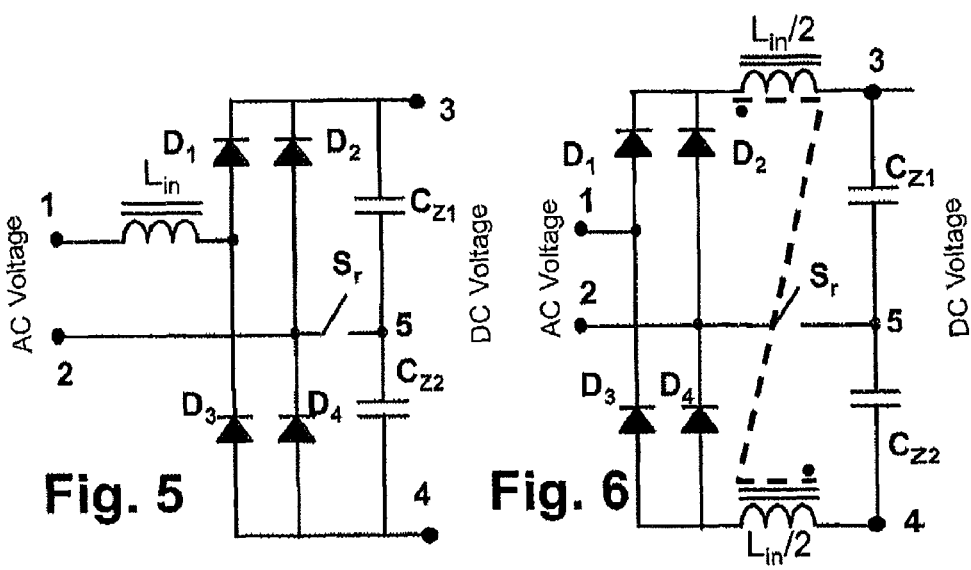
FIGS. 5 and 6 show examples of input-side rectifiers with a range changeover switch to provide voltage doubling.

Improvements can be achieved in the power factor and the non-linear distortion by modification of the input stage (rectifier). Passive solutions to prevent harmonics, as shown in FIGS. 5 and 6, can be used for applications in the low-energy range, in order to achieve the desired improvements. When a large smoothing inductance $L_n$ is used, the single-phase full-bridge rectifier with the diodes $D_1$, $D_2$, $D_3$, $D_4$ produces a square-wave current with a power factor of 90% and a distortion factor (harmonic load) of 48%. These achievable values can deteriorate when the value of the smoothing inductance $L_{in}$ is reduced. At least in the low-energy range, or when the connected load is small, the values required for the distortion factor or the harmonic load are achieved.

Figure 7:
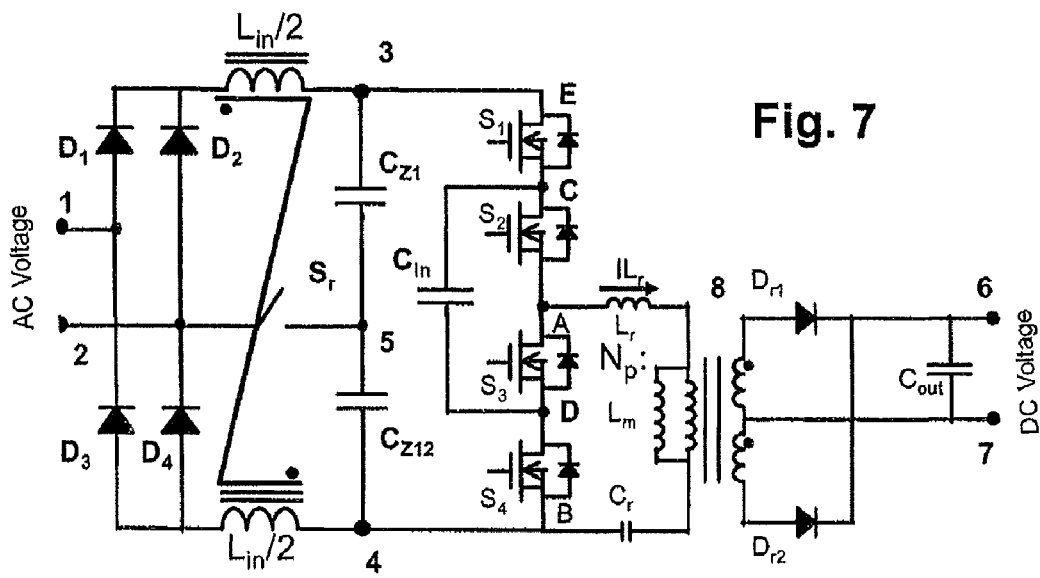
FIG. 7 shows an exemplary AC/DC intermediate-circuit converter with passive harmonic (distortion factor) reduction.

FIGS. 5 and 6 show exemplary configurations of two rectifiers which allow the option of voltage doubling, by the use of a range changeover switch $S_r$. One difference between the exemplary circuit arrangements shown in FIG. 5 and FIG. 6 is the arrangement of the smoothing inductance $L_{in}$. In the circuit arrangement shown in FIG. 5, the smoothing inductance $L_{in}$ is arranged on the AC side. In the circuit arrangement shown in FIG. 6, the smoothing inductance $L_{in}$ is arranged on the DC side, and in this case is subdivided into two components $L_{in}/2$, which are coupled to one another, thus leading to a reduction in the size and weight of this passive component. The meanings of the symbols are as follows:

$D_1$, $D_2$, $D_3$, $D_4$ Diodes in the rectifier
$C_{Z1}$, $C_{Z2}$ Intermediate-circuit capacitor
$L_{in}$ Smoothing inductance in the rectifier
$S_r$ Range changeover switch for the rectifier
1, 2 AC input connections
5 DC intermediate-circuit centre connection In view of the above, FIG. 7 illustrates an exemplary configuration of an AC/DC intermediate-circuit converter (with a two-stage configuration) with passive harmonic (distortion factor) reduction. The (input) rectifier can be in the form of a diode bridge rectifier with the diodes $D_1$, $D_2$, $D_3$, $D_4$ and with a subdivided passive smoothing inductance $L_{in}$ on the DC side to reduce the distortion factor (harmonic load). In this case, the DC voltage in the intermediate circuit is not matched to a predetermined (desired) value, thus making it more difficult to optimize the downstream DC/DC converter. The filter/smoothing and semiconductor components should, for example, be designed to be loaded with the highest possible current, which occurs at the lowest network voltage. The exemplary circuit configuration includes an arrangement with a range changeover switch $S_r$ to reduce the loads on the downstream DC/DC converter resulting from major discrepancies in the DC input voltage.

This arrangement is combined with the arrangement as explained above for the exemplary ZVS three-level DC/DC resonant converter or modulation strategy with the "two-level operating mode" and "three-level operating mode", in order to comply with the requirements that occur with a very wide AC input voltage range, thus allowing universal operation on network voltages both in the lower AC input voltage range of 90-135 V and in the upper AC input voltage range of 400-550 V, as follows:

A) In the lower AC input voltage range of 90-135 V, the range changeover switch $S_r$ is closed and the voltage on the capacitor in the intermediate circuit is twice as high as the peak value of the AC input voltage, with values of 254 to 380 V. The ZVS three-level DC/DC resonant converter can be operated using the "two-level operating mode" modulation strategy, as explained above with reference to FIGS. 2, 3a-3c. The output voltage is regulated by frequency modulation, using the primary switches $S_1$, $S_2$, $S_3$, $S_4$.

B) For central AC input voltages in the range 160-265 V, the range changeover switch $S_r$ is open, thus leading to an unregulated DC voltage in the range 235-380 V. The DC/DC converter can be operated as in A), that is to say using the "two-level operating mode" modulation strategy, as explained above with reference to FIGS. 2, 3a-3c.

C) For higher AC input voltages in the range 400-550 V, the range changeover switch $S_r$ can likewise be open, thus leading to an unregulated DC voltage in the range 565-780 V. This voltage corresponds approximately to twice the value of the normal network voltage. To compensate for this, the exemplary ZVS three-level DC/DC resonant converter can be operated using the "three-level operating mode" modulation strategy as explained above with reference to FIG. 4. The output voltage can likewise be regulated by frequency modulation using the primary switches $S_1$, $S_2$, $S_3$, $S_4$.

It can also be stated that the root-mean-square values and peak values of the currents flowing in the power semiconductors, in the LLC series-resonant circuit components and in the transformer 8 are the same in both the "two-level operating mode" and the "three-level operating mode" modulation strategies. Furthermore, the switching losses are the same in all cases. In addition, the parameters which are relevant for the transformer design are similar for both modulation strategies. Overall, it can be stated that the solution exemplary configuration as shown in FIG. 7 can be used advantageously both for a wide AC input voltage range—90 to 550 V, for example—and for a relatively high value of the AC input voltage—+550 V, for example—without this disadvantageously influencing the efficiency and the power density in the AC/DC intermediate-circuit converter.

Figure 8:
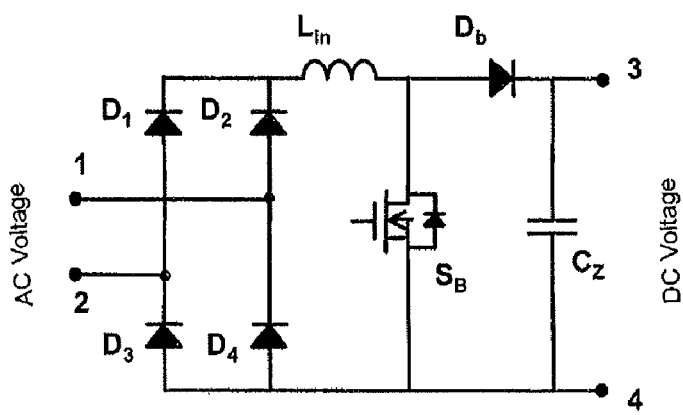

Solutions based on the two-stage configuration (rectifier+DC/DC converter) for AC/DC intermediate-circuit converters with the capability to actively influence the power factor (power-factor control) will now be described in greater detail. FIGS. 8-12 in this context show simplified circuit arrangements of booster rectifiers which can be used for the first stage of the proposed two-stage configuration:

- FIG. 8 shows a single-switch booster rectifier (single-switch boost converter) with diodes $D_1, D_2, D_3, D_4$ in the bridge rectifier, a DC-side smoothing inductance $L_{in}$, a switch $S_B$, an output diode $D_b$, and an intermediate-circuit capacitor $C_Z$;
- FIG. 9 shows a booster rectifier with diodes $D_1, D_2, D_3, D_4$ in the bridge rectifier, two interacting switches $S_{B1}, S_{B2}$, two associated DC-side, subdivided smoothing inductances $L_{in}/2$, and two output diodes $D_{b1}$ and $D_{b2}$ and an intermediate-circuit capacitor $C_Z$ (interleaved boost converter);
- FIG. 10 shows a three-level booster rectifier with diodes $D_1, D_2, D_3, D_4$ in the bridge rectifier, two subdivided smoothing inductances $L_{in}/2$ which are located at the output of the bridge rectifier and are coupled to one another, two output diodes $D_{b3}$ and $D_{b4}$, which are connected to the DC intermediate-circuit connections 3, 4, two series-connected switches $S_{B1}, S_{B2}$ which are connected to the smoothing inductances, two intermediate-circuit capacitors $C_{Z1}, C_{Z2}$, which are connected in series between the DC intermediate-circuit connections 3, 4, and a range changeover switch $S_r$, which is arranged between the bridge rectifier and the common connection point (corresponding to DC intermediate-circuit centre connection 5) of the switches and intermediate-circuit capacitors;
- FIG. 11 shows a single-phase Vienna booster rectifier (e.g., single-phase Vienna boost converter) with diodes $D_1, D_2, D_3, D_4$ in the bridge rectifier, an AC-side smoothing inductance $L_{in}$, two output diodes $D_{b3}$ and $D_{b4}$ which are connected to the DC intermediate-circuit connections 3, 4, two intermediate-circuit capacitors $C_{Z1}, C_{Z2}$ which are connected in series between the DC intermediate-circuit connections 3, 4, and a switch $S_B$ which is connected between the DC connections of the bridge rectifier;
- FIG. 12 shows a two-switch, three-level booster rectifier (i.e., two-switch, three-level boost converter), in which, in comparison to the circuit shown in FIG. 11, the switch $S_B$ is missing and the diodes $D_2, D_4$ in the bridge rectifier have been replaced by switches $S_{B1}, S_{B2}$.

The meanings of the symbols in this case are:
$D_b, D_{b1}, D_{b2}, D_{b3}, D_{b4}$ Output diodes of the rectifier
$S_B, S_{B1}, S_{B2}$ Switches in the rectifier, including feedback diodes In all the solutions, the bridge rectifier can also have active power-factor control whose fundamental method of operation improves the input current distortion factor (or the harmonic load). The rectifiers can be operated in the CCM mode (Continuous Conduction Mode), thus resulting in better regulation of the input current. In addition, the non-pulsating input current of the rectifier can reduce the requirements to which the EMI filter is subject (filter to reduce electromagnetic functional interference).

FIG. 8 shows a simplified configuration of a conventional single-switch booster rectifier, FIG. 9 shows a simplified configuration of a booster rectifier with two interacting switches. An advantage of the exemplary booster rectifier shown in FIG. 9 is that the equivalent operating frequency at the input of the rectifier is increased without adversely affecting the switching losses in the rectifier. This results in a reduction in the EMI filters and in the total inductance. One additional advantage of the arrangement shown in FIG. 9 results from the two smoothing inductances being coupled to one another using a common core. The solution configurations shown in FIGS. 8 and 9 can be used universally for different network voltage conditions, for example in the AC voltage range 90 V-265 V, in which case the intermediate circuit can be designed for a DC voltage of 400 V. MOSFETs or IGBTs for 500 V or 600 V are used in this case. However, the efficiency of the rectifier is adversely affected in the lower AC input voltage range, which may necessitate a reduction in power. As mentioned above, the efficiency can be improved by implementing a dual-DC intermediate circuit (with a range changeover switch) in the operating mode of the AC/DC intermediate-circuit converter. In this case, three-level rectifiers can be used to take account of these conditions without adversely affecting the efficiency of the converter.

FIGS. 10, 11, 12 show exemplary configurations of three-level rectifiers for use with the upper AC input voltage range 400-550 V, in which the DC voltage in the intermediate circuit can be designed for improved operation at 800 V. Advantages of these three-level rectifiers shown in FIGS. 10, 11, 12 over conventional single-switch booster rectifiers are, for example, the reduced voltage load on the main components (reduced to half the DC voltage of the intermediate circuit) and the suppression of the current ripple, which can reduce the physical size of the smoothing inductance. Power semiconductors designed for a lower voltage have advantageously improved electrical characteristics, such as reduced line losses and lower switching losses. The switching losses when switched on are reduced, since power semiconductors designed for a lower voltage have lower capacitances on the output side. Furthermore, the power semiconductor can be loaded with only half the DC voltage of the intermediate circuit. This leads to lower losses overall. In addition, diodes to which a lower voltage is to be applied can have a better reverse recovery time characteristic.

According to an exemplary embodiment, the rectifiers are provided to be suitable not only to cover the upper AC input voltage range of 400-550 V, but for the entire AC input voltage range of 90-550 V. In this situation, the efficiency of the converter is adversely affected to an even greater extent in the lower AC input voltage range since, in this lower range, the DC gain of the converter is loaded in order to achieve the required DC voltage of 800 V in the intermediate circuit. The use of a dual-DC intermediate circuit (with a range changeover switch) improves the efficiency in the lower AC input voltage range.

Figure 13:
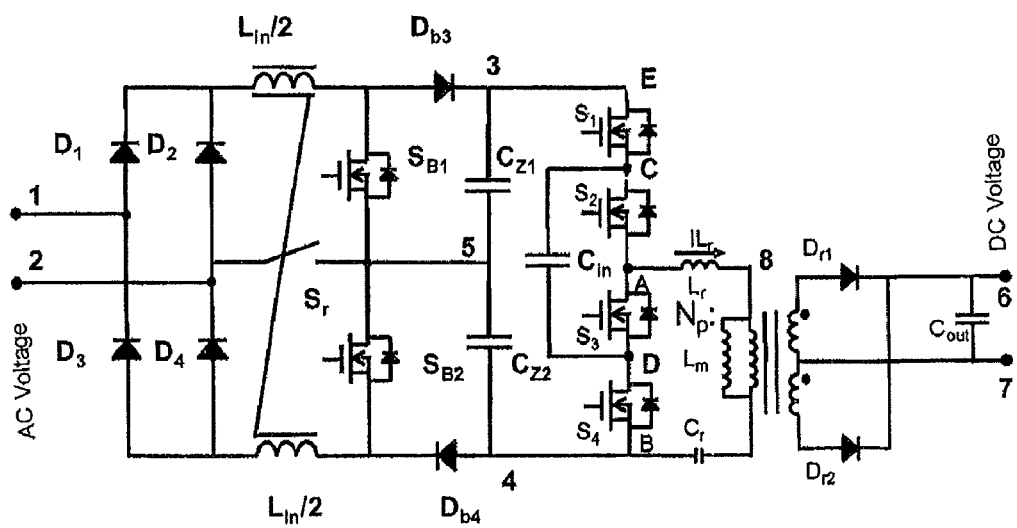
FIG. 13 shows an exemplary AC/DC intermediate-circuit converter with a dual DC intermediate circuit and with active power-factor control.

FIG. 13 illustrates a simplified exemplary embodiment of an AC/DC intermediate-circuit converter with a dual-DC intermediate circuit that results from the above additional explanatory configurations according to FIGS. 8-12, and which is very highly suitable for covering the wide AC input voltage range of 90-550 V. The first stage is implemented by a three-level (booster) rectifier with a range changeover switch $S_r$ (see the arrangement shown in FIG. 10, for example). The two switches $S_{B1}$, $S_{B2}$ in the three-level booster rectifier can be operated with a phase shift of 180° between them, to optimally suppress the current ripple by the smoothing inductance. In addition, the two subdivided smoothing inductances $L_{in}/2$ can be coupled to one another to minimize the dimensions and volumes of these passive components. A dual-DC intermediate circuit (dual rectifier concept) can be incorporated, using the range changeover switch $S_r$:

In the lower AC input voltage range of 90-135 V, the range changeover switch $S_r$ is closed, thus allowing a voltage-doubling function of the rectifier.

In the central AC input voltage range of 160-265 V, the range changeover switch $S_r$ is open, and the rectifier operates in the conventional manner.

The dual-DC intermediate circuit can advantageously lead to a decrease in the root-mean-square values and peak values of the current, and of the circulating energy. Overall, both operating modes have similar characteristics to those of conventional single-switch booster rectifiers.

The range changeover switch $S_r$ can be implemented in a mechanical form, in an electromechanical form, in the form of a semiconductor, or in the form of a simple wire link. The DC voltage in the intermediate circuit can be set to 400 V in both examples of the AC input voltage ranges (lower and central range) mentioned above. The separate DC/DC converter can be operated using the exemplary "two-level operating mode" modulation strategy as explained above with reference to FIGS. 2, 3a, 3b, 3c.

The DC voltage in the intermediate circuit can be set to 800 V in the upper AC input voltage range of 400-550 V. To achieve the same DC gain characteristic, the exemplary ZVS three-level DC/DC resonant converter can be operated using the exemplary "three-level operating mode" modulation strategy as explained above with reference to FIG. 4. It should be understood that the waveforms in the LLC series-resonant circuit and the transformer 8 are the same despite the different setting of the DC voltage in the intermediate circuit. This means that both the root-mean-square currents and the peak currents in the power semiconductors and the passive components remain unchanged, and therefore the same requirements for cooling remain unchanged. This ensures good optimization over the entire wide AC input voltage range.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List Of Reference Symbols
1, 2 AC input connections
3, 4 DC intermediate-circuit connections
5 DC intermediate-circuit centre connection
6, 7 DC output connections
8 Transformer
A, B, C, D Circuit point in the DC/DC converter
$C_{in}$ Input capacitor in the DC/DC converter
$C_Z$, $C_{Z1}$, $C_{Z2}$ Intermediate-circuit capacitor
$C_{out}$ Output capacitor of the DC/DC converter
$C_r$ Resonant capacitor in the DC/DC converter
$D_{r1}$, $D_{r2}$ Secondary diodes in the DC/DC converter
$D_1$, $D_2$, $D_3$, $D_4$ Diodes in the rectifier
$D_b$, $D_{b1}$, $D_{b2}$, $D_{b3}$, $D_{b4}$ Output diodes of the rectifier
$I_{Lm}$ Current through the magnetization inductance
$I_{Lr}$ Current through the resonant inductance
$I_{S1}$, $I_{S1}$ Current through the primary switch
$L_{in}$ Smoothing inductance in the rectifier
$L_m$ Magnetization inductance of the transformer of the DC/DC converter
$L_r$ Resonant inductance of the DC/DC converter
n Transformation ratio of the transformer in the DC/DC converter
$S_1$, $S_2$, $S_3$, $S_4$ Primary switch on the DC/DC converter including feedback diodes
$S_B$, $S_{B1}$, $S_{B2}$ Switch in the rectifier, including feedback diodes
$S_r$ Range changeover switch for the rectifier
$t_0$, $t_1$, $t_2$, $t_3$ Times
$V_{ab}$ Voltage between the circuit points A, B
$V_{gs}$ Drive signals for the primary switches in the DC/DC converter
$V_{in}$ Input voltage to the DC/DC converter
$V_o$n Transformed output voltage of the DC/DC converter

What is claimed is:

1. An AC/DC intermediate-circuit converter having a very wide AC input voltage range with a ZVS three-level DC/DC resonant converter, which has four primary switches that are arranged in series between first and second DC intermediate-circuit connections and that include a first and a second outer primary switch, and a first and a second inner primary switch, the AC/DC intermediate-circuit converter comprising:

a transformer having a primary winding;

an LLC series-resonant circuit having a resonant inductance connected to a common connection point between the two inner primary switches;

a magnetization inductance connected in parallel with the primary winding of the transformer and a resonant capacitor to a common connection point between the second outer primary switch and the second DC intermediate-circuit connection;

an input capacitor connected between a common connection point between the first outer primary switch and the first inner primary switch and a common connection point between the second inner primary switch and the second outer primary switch;

two intermediate-circuit capacitors being connected in series between the first and second DC intermediate-circuit connections with a common connection point between the two intermediate-circuit capacitors forming a DC intermediate-circuit centre connection;

a rectifier having, on a DC side thereof, DC connections connectable to the first and second DC intermediate-circuit connections, and, on an AC side thereof, AC connections being configured to have an AC input voltage applied thereto; and a range changeover switch arranged between an AC input connection and the DC intermediate-circuit centre connection, wherein:

the range changeover switch is configured to be closed in a lower AC input voltage range, when the ZVS three-level DC/DC is operated in accordance with a two-level operating mode in which, according to a first level of the two-level operating mode, the first outer primary switch and the first inner primary switch are driven jointly, and, according to a second level of the two-level operating mode, the second inner primary switch and the second outer primary switch are driven jointly, such that the LLC series-resonant circuit has the full DC input voltage, which is present between the first and second DC intermediate-circuit connections, applied thereto;

the range changeover switch is configured to be open in a central AC input voltage range when the ZVS three-level DC/DC resonant converter is operated according to the two-level operating mode;

the range changeover switch is configured to be open in an upper AC input voltage range when the ZVS three-level DC/DC resonant converter is operated according to a three-level operating mode, in which, according to one level of the three-level operating mode, the first outer primary switch and the second inner primary switch are operated in a complementary manner, and, according to another level of the three-level operating mode, the first inner primary switch and the second outer primary switch are operated in a complementary manner, such that the LLC series-resonant circuit has only half the DC input voltage, which is present between the first and second DC intermediate-circuit connections, applied thereto.

2. The AC/DC intermediate-circuit converter according to claim 1, wherein the resonant inductance is at least partially constituted by the stray inductance of the transformer.

3. The AC/DC intermediate-circuit converter according to claim 1, wherein the rectifier is constituted by a non-controllable full-bridge rectifier having a smoothing inductance on the AC side.

4. The AC/DC intermediate-circuit converter according to claim 1, wherein the rectifier is constituted by a non-controllable full-bridge rectifier with a smoothing inductance, which comprises two components coupled to one another on the DC side.

5. The AC/DC intermediate-circuit converter according to claim 1, wherein the rectifier is constituted by a controllable three-level booster rectifier with two smoothing inductances, which are located at an output of a bridge rectifier, and which are split and are coupled to one another, two output diodes which are connected to the first and second DC intermediate-circuit connections, and two series-connected switches which are connected to the smoothing inductances.

6. The AC/DC intermediate-circuit converter according to claim 1, wherein the rectifier is constituted by a controllable single-phase Vienna booster rectifier with an AC-side smoothing inductance, two output diodes and a switch connected between DC connections of a bridge rectifier.

7. The AC/DC intermediate-circuit converter according to claim 1, wherein the rectifier is constituted by a controllable two-switch, three-level booster rectifier with an AC-side smoothing inductance, two output diodes, and a bridge rectifier having two diodes and two switches.

8. The AC/DC intermediate-circuit converter according to claim 2, wherein the rectifier is constituted by a non-controllable full-bridge rectifier having a smoothing inductance on the AC side.

9. The AC/DC intermediate-circuit converter according to claim 2, wherein the rectifier is constituted by a non-controllable full-bridge rectifier with a smoothing inductance, which comprises two components coupled to one another on the DC side.

10. The AC/DC intermediate-circuit converter according to claim 2, wherein the rectifier is constituted by a controllable three-level booster rectifier with two smoothing inductances, which are located at an output of a bridge rectifier, and which are split and are coupled to one another, two output diodes which are connected to the first and second DC intermediate-circuit connections, and two series-connected switches which are connected to the smoothing inductances.

11. The AC/DC intermediate-circuit converter according to claim 2, wherein the rectifier is constituted by a controllable single-phase Vienna booster rectifier with an AC-side smoothing inductance, two output diodes and a switch connected between DC connections of a bridge rectifier.

12. The AC/DC intermediate-circuit converter according to claim 2, wherein the rectifier is constituted by a controllable two-switch, three-level booster rectifier with an AC-side smoothing inductance, two output diodes, and a bridge rectifier having two diodes and two switches.

13. An AC/DC intermediate-circuit converter having a very wide AC input voltage range with a ZVS three-level DC/DC resonant converter, which has four primary switches that are arranged in series between first and second DC intermediate-circuit connections and that include a first and a second outer primary switch, and a first and a second inner primary switch, the AC/DC intermediate-circuit converter comprising:

an LLC series-resonant circuit having a resonant inductance connected to a common connection point between the two inner primary switches;

two intermediate-circuit capacitors being connected in series between the first and second DC intermediate-circuit connections with a common connection point between the two intermediate-circuit capacitors forming a DC intermediate-circuit centre connection; and a range changeover switch arranged between an AC input connection and the DC intermediate-circuit centre connection, wherein:

the range changeover switch is configured to be closed in a lower AC input voltage range, when the ZVS three-level DC/DC is operated in accordance with a two-level operating mode in which, according to a first level of the two-level operating mode, the first outer primary switch and the first inner primary switch are driven jointly, and, according to a second level of the two-level operating mode, the second inner primary switch and the second outer primary switch are driven jointly, such that the LLC series-resonant circuit has the full DC input voltage, which is present between the first and second DC intermediate-circuit connections, applied thereto;

the range changeover switch is configured to be open in a central AC input voltage range when the ZVS three-level DC/DC resonant converter is operated according to the two-level operating mode;

the range changeover switch is configured to be open in an upper AC input voltage range when the ZVS three-level DC/DC resonant converter is operated according to a three-level operating mode, in which, according to one level of the three-level operating mode, the first outer primary switch and the second inner primary switch are operated in a complementary manner, and, according to another level of the three-level operating mode, the first inner primary switch and the second outer primary switch are operated in a complementary manner, such that the LLC series-resonant circuit has only half the DC input voltage, which is present between the first and second DC intermediate-circuit connections, applied thereto.

14. The AC/DC intermediate-circuit converter according to claim 13, comprising a rectifier having, on a DC side thereof, DC connections connectable to the first and second DC intermediate-circuit connections, and, on an AC side thereof, AC connections being configured to have an AC input voltage applied thereto.

* * * * *